(12) United States Patent
Han et al.

(10) Patent No.: US 9,473,612 B2
(45) Date of Patent: Oct. 18, 2016

(54) SWITCHING A DEVICE BETWEEN A LOCKED STATE AND AN UNLOCKED STATE

(71) Applicant: Nokia Technologies Oy, Espoo (FI)

(72) Inventors: Maokun Han, Beijing (CN); Chaobin Guo, Beijing (CN); Ziyan Chen, Beijing (CN); Guangjun Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/647,749

(22) PCT Filed: Nov. 28, 2012

(86) PCT No.: PCT/CN2012/085428
§ 371 (c)(1),
(2) Date: May 27, 2015

(87) PCT Pub. No.: WO2014/082218
PCT Pub. Date: Jun. 5, 2014

(65) Prior Publication Data
US 2015/0304474 A1    Oct. 22, 2015

(51) Int. Cl.
*H04M 1/66* (2006.01)
*H04M 1/673* (2006.01)
*H04W 12/08* (2009.01)

(52) U.S. Cl.
CPC ............... *H04M 1/66* (2013.01); *H04M 1/673* (2013.01); *H04W 12/08* (2013.01)

(58) Field of Classification Search
CPC .... H04M 1/67; H04M 2250/22; H04M 1/66; H04W 12/06

USPC ......................................................... 455/411
See application file for complete search history.

(56) References Cited

U.S. PATENT DOCUMENTS

| 2007/0150842 | A1* | 6/2007 | Chaudhri | ............ G06F 3/04883 715/863 |
| 2009/0187676 | A1  | 7/2009 | Griffin et al. | |
| 2010/0222049 | A1  | 9/2010 | Kim | |
| 2010/0306718 | A1* | 12/2010 | Shim | ................... G06F 3/04883 715/863 |
| 2012/0133484 | A1  | 5/2012 | Griffin | |

(Continued)

FOREIGN PATENT DOCUMENTS

| CN | 101360301 A | 2/2009 |
| CN | 102779012 A | 11/2012 |
| KR | 2010-0098804 | 9/2010 |

OTHER PUBLICATIONS

International Search Report and Written Opinion from corresponding International Patent Application No. PCT/CN2012/085428, dated Sep. 5, 2013.

(Continued)

*Primary Examiner* — Don N Vo
(74) *Attorney, Agent, or Firm* — Alston & Bird LLP (57) ABSTRACT

A method, apparatus and a computer program is provided. The apparatus comprises: at least one processor; and at least one memory storing computer program code configured, working with the at least one processor, to cause at least the following to be performed: responding to user input by switching a device from an unlocked state to a locked state; and setting a user input process for switching the device from the locked state to the unlocked state, in dependence upon the user input provided to switch the device from the unlocked state to the locked state.

20 Claims, 6 Drawing Sheets

(56) References Cited

U.S. PATENT DOCUMENTS

| | | | |
|---|---|---|---|
| 2012/0188198 A1* | 7/2012 | Jeong | G06F 3/044 345/174 |
| 2012/0223890 A1* | 9/2012 | Borovsky | G06F 3/04883 345/173 |
| 2014/0195937 A1 | 7/2014 | Kim | |

OTHER PUBLICATIONS

Extended European Search Report for corresponding European Application No. 12889211.4 dated Jul. 12, 2016, 8 pages.

* cited by examiner

SWITCHING A DEVICE BETWEEN A LOCKED STATE AND AN UNLOCKED STATE

TECHNOLOGICAL FIELD

Embodiments of the present invention relate to switching a device between a locked state and an unlocked state. In particular, they relate to switching a portable electronic device, such as a mobile telephone, between a locked state and an unlocked state.

BACKGROUND

A portable electronic device may have a locked state and an unlocked state. When the device is in the locked state, the functionality of the device may be restricted. In some circumstances it may be necessary for a user to provide a translation input and/or provide a password in order to switch the device from being in the locked state to being in the unlocked state.

BRIEF SUMMARY

According to various, but not necessarily all, embodiments of the invention there is provided an apparatus, comprising: at least one processor; and at least one memory storing computer program code configured, working with the at least one processor, to cause at least the following to be performed: responding to user input by switching a device from an unlocked state to a locked state; and setting a user input process for switching the device from the locked state to the unlocked state, in dependence upon the user input provided to switch the device from the unlocked state to the locked state.

According to various, but not necessarily all, embodiments of the invention there is provided a method, comprising: responding to user input by switching a device from an unlocked state to a locked state; and setting a user input process for switching the device from the locked state to the unlocked state, in dependence upon the user input provided to switch the device from the unlocked state to the locked state.

According to various, but not necessarily all, embodiments of the invention there is provided a computer readable medium storing computer program code configured, working with the at least one processor, to cause at least the following to be performed: responding to user input by switching a device from an unlocked state to a locked state; and setting a user input process for switching the device from the locked state to the unlocked state, in dependence upon the user input provided to switch the device from the unlocked state to the locked state.

According to various, but not necessarily all, embodiments of the invention there is provided an apparatus, comprising: means for responding to user input by switching a device from an unlocked state to a locked state; and means for setting a user input process for switching the device from the locked state to the unlocked state, in dependence upon the user input provided to switch the device from the unlocked state to the locked state.

BRIEF DESCRIPTION

For a better understanding of various examples that are useful for understanding the brief description, reference will now be made by way of example only to the accompanying drawings in which.

DETAILED DESCRIPTION

Embodiments of the invention relates to switching a device between a locked state and an unlocked state.

In this regard, the Figures illustrate an apparatus 10/20, comprising: at least one processor 12; and at least one memory 14 storing computer program code 18 configured, working with the at least one processor 12, to cause at least the following to be performed: responding to user input by switching a device 20 from an unlocked state to a locked state; and setting a user input process for switching the device 20 from the locked state to the unlocked state, in dependence upon the user input provided to switch the device 20 from the unlocked state to the locked state.

Figure 1:
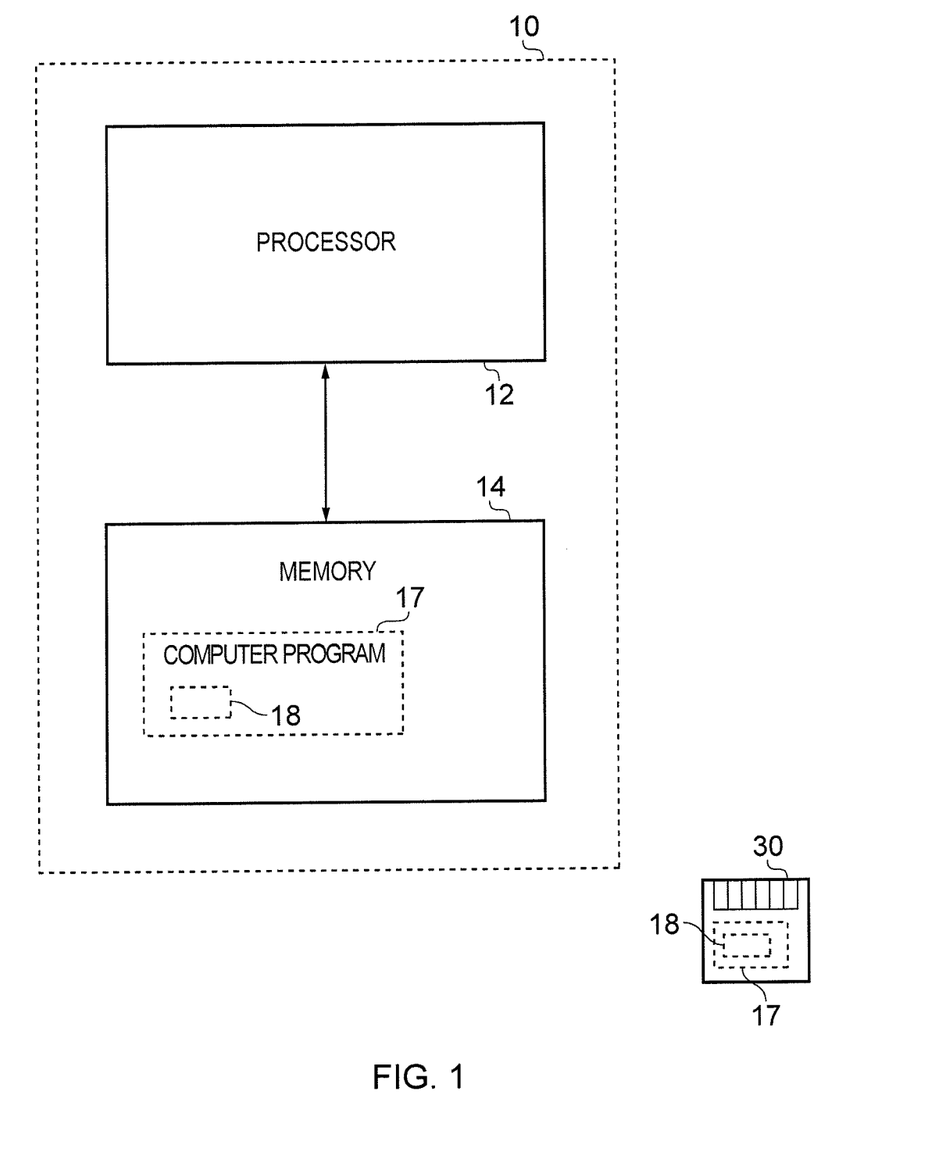
FIG. 1 illustrates a first apparatus.

FIG. 1 illustrates a first apparatus 10 comprising a processor 12 and a memory 14. The apparatus 10 may, for example, be a chip or a chipset.

The processor 12 is configured to read from and write to the memory 14. The processor 12 may comprise an output interface via which data and/or commands are output by the processor 12 and an input interface via which data and/or commands are input to the processor 12. Although the processor 12 is illustrated as a single component in FIG. 1, it may be implemented as one or more separate components.

The memory 14 stores a computer program 17 comprising computer program instructions/code 18 that control the operation of the apparatus 10 when loaded into the processor 12. The computer program code 18 provides the logic and routines that enables the apparatus 10 to perform the methods illustrated in FIG. 5. The processor 12, by reading the memory 14, is able to load and execute the computer program 17.

Although the memory 14 is illustrated as a single component it may be implemented as one or more separate components some or all of which may be integrated/removable and/or may provide permanent/semi-permanent/dynamic/cached storage.

The computer program 17 may arrive at the apparatus 10 via any suitable delivery mechanism 30. The delivery mechanism 30 may be, for example, a non-transitory computer-readable storage medium such as a compact disc read-only memory (CD-ROM) or digital versatile disc (DVD). The delivery mechanism 30 may be a signal configured to reliably transfer the computer program 17. The apparatus 10 may cause the propagation or transmission of the computer program 17 as a computer data signal.

Figure 2:
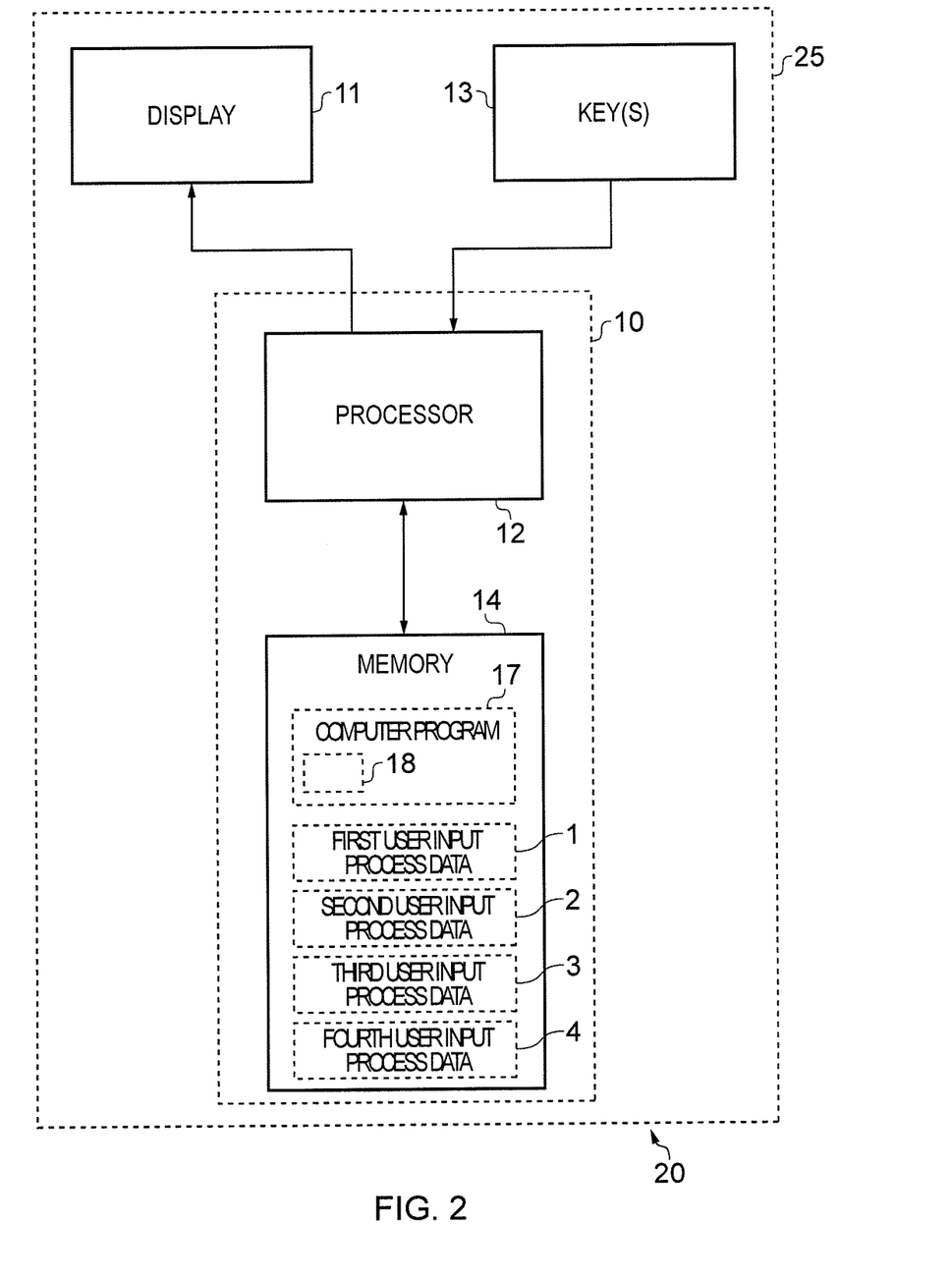
FIG. 2 illustrates a second apparatus.

FIG. 2 illustrates a second apparatus 20. The second apparatus 20 is an electronic device. It may, for example, be a hand portable electronic device such as a mobile telephone, a hand portable music player, a tablet computer or a dedicated hand held games console.

The device 20 includes a display 11, at least one key 13, an external housing 25 and the apparatus 10 illustrated in FIG. 1. The external housing 25 houses the display 11, the at least one key 13, the processor 12 and the memory 14.

The display 11 may, for example, be a touch sensitive display. The touch sensitive display may be any type of touch sensitive display. It might function, for example, using capacitive, resistive, infrared, dispersive signal and/or acoustic pulse technology.

The one or more keys 13 are separate from (and may be spaced from) the display 11. The one or more keys 13 might be any type of keys such as, for example, mechanical keys that displace when actuated or capacitive keys that do not displace when actuated.

The memory 14 is illustrated in FIG. 2 as storing first user input process data 1, second user input process data 2, third user input process data 3 and fourth user input process data 4. The first, second, third and fourth user input process data 1-4 will be described in further detail later.

The elements 11, 12, 13 and 14 are operationally coupled and any number or combination of intervening elements can exist between them (including no intervening elements).

Figure 3:
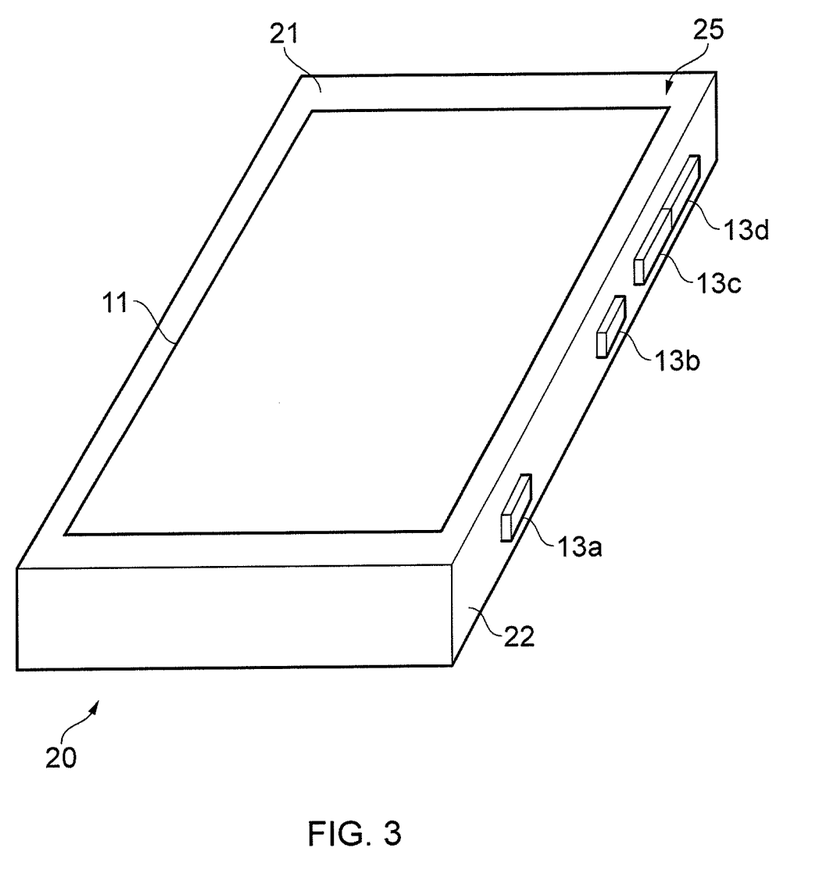
FIG. 3 illustrates a perspective view of a portable electronic device.

FIG. 3 illustrates a perspective view of one example of the device 20 illustrated in FIG. 2. In this example, the device comprises four keys 13a, 13b, 13c, 13d although it may comprise greater or fewer keys in other examples.

FIG. 3 illustrates the display 11 on a front face 21 of the external housing 25 and the keys 13a-13d on a side face 22 of the external housing 25. While the display 11 and the keys 13a-13d are located on different faces 21, 22 of the device 20 in this example, in other examples they may be located on the same face.

The device 20 has a locked state and an unlocked state. In the examples described below, these states are mutually exclusive: the device 20 cannot be in the locked state and the unlocked state at the same time.

When the device 20 is in the unlocked state, the processor 12 responds to user inputs received by the device 20 (at, for example, the touch sensitive display 11 and/or one or more of the keys 13a-13d) by causing functions to be performed associated with those inputs. This might, for example, involve launching a particular application or displaying a particular menu.

When the device 20 is in the locked state, the functionality of the device 20 is restricted. For example, when the device 20 is in the locked state, it does not perform at least some functions in response to user inputs that would otherwise cause those functions to be performed by the device 20.

If the device 20 is a telephone, when the telephone is in the locked state the calling functionality of the telephone might be restricted. For example, the telephone may only be able to make calls to one or more emergency numbers, but not other numbers.

In some implementations, the processor 12 may be configured to disable (or partially disable) the display 11 when the device 20 enters the locked state. The processor 12 might, for example, disable the display 11 by it switching off. If the display 11 is a touch sensitive display, when it is disabled (or partially disabled) it might become non-responsive to touch. For instance, in this regard, the touch functionality of the display 11 might be switched off or, alternatively, the processor 12 might be configured not to respond to signals provided to it by the display 11.

Both the unlocked state and the locked state are powered states of the device 20. That is, the device 20 consumes power (for instance, from a battery) when it is in the unlocked state and when it is in the locked state. However, the power consumption of the device 20 when it is in the unlocked state may be greater than when it is in the locked state. When the device 20 is switched off, it is not in the unlocked state or the locked state, and it consumes no power.

In some implementations, the device 20 may comprise one or more radio transceivers that are configured to connect the device 20 to one or more networks. The networks may, for example, include one or more cellular telephone networks and one or more networks that operate in accordance with one or more IEEE (Institute of Electrical and Electronic Engineers) 802.11 standards.

The device 20 may be connected to the network(s) when it is in the unlocked and state and when it is in the locked state. For example, the device 20 may receive incoming calls and messages when it is connected to the network(s). When the device 20 is switched off, it is not connected to any networks.

Figure 4A:
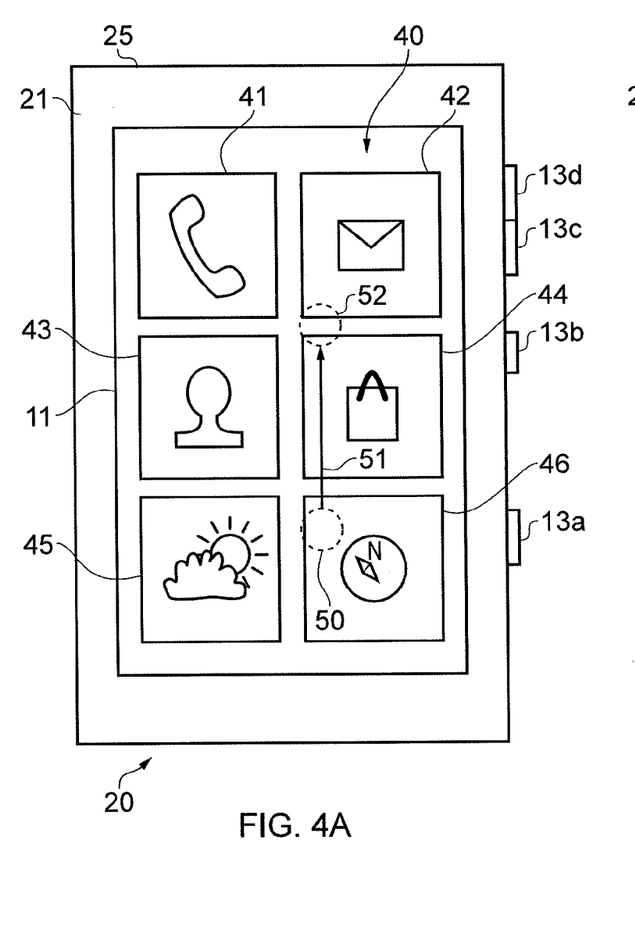
FIG. 4A illustrates the portable electronic device in an unlocked state.

FIG. 4A illustrates the device 20 in an unlocked state. In the illustration, the display 11 is a touch sensitive display displaying a "home screen" 40 comprising a plurality of graphical items 41-46. In this example, each of the graphical items 41-46 relates to a different application stored in the memory 14 of the device 20.

While the home screen 40 is displayed, the processor 12 is configured to recognize a touch input at a graphical item 41-46 as a user selection of that item 41-46, and responds by launching an application associated with the selected graphical item 41-46. The touch input may, for example, be a static touch input in which an object (such as a digit or a stylus) is placed in contact with the touch sensitive display 11 at a graphical item 41-46, and the object is not moved across the display 11 while it is in contact with the display 11.

In this example, the processor 12 is also configured to respond to a translation input made by a user. A translation input may, for example, be made by displacing an object (such as a digit or a stylus) from a start point to an end point.

FIG. 4A illustrates an example as to how a translation input may be made from a start point 50 to an end point 52. In the illustrated example, an object (such as a digit or a stylus) is placed in contact with the display 11 at the start point 50 and moved across the display 11, while it is in contact with the display, in the direction of the arrow 51 until the end point 52 is reached. In this example, the processor 12 may respond to the translation input by causing the home screen 40 to scroll downwards.

An example of a method according to embodiments of the invention will now be described in relation to FIGS. 4A to 4D and FIG. 5.

Figure 5:
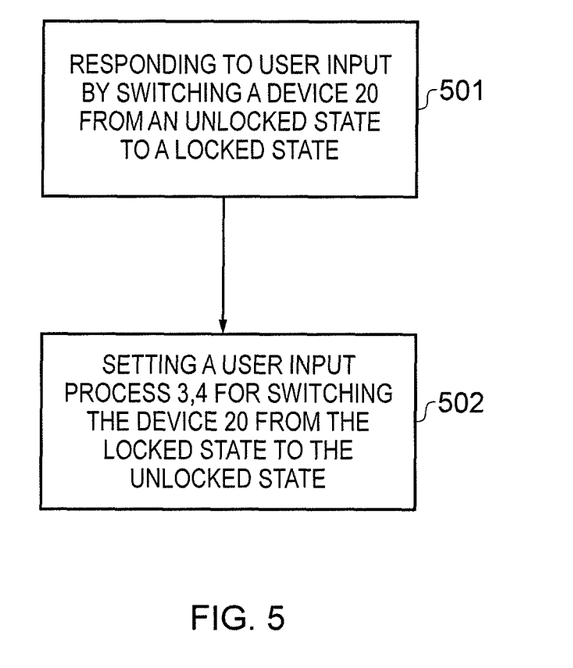
FIG. 5 illustrates a flow chart of a method.

At block 501 in FIG. 5, the user provides user input, while the device 20 is in the unlocked state, which the processor 12 responds to by switching the device 20 from the unlocked state to the locked state. The user input that is provided to switch the device 20 from the unlocked state to a locked state may be one of plurality of user input processes.

The user input process that is used to switch the device 20 from the unlocked state to the locked state in a particular instance determines the user input process that is later required to switch the device 20 back to the unlocked state.

According to a first user input process for locking the device 20, the user may actuate a lock key 13b on a single occasion, causing the processor 12 to switch the device 20 from the unlocked state to the locked state. According to a second user input process for locking the device 20, the user may actuate the lock key 13b twice within a threshold period of time, causing the processor 12 to switch the device 20 from the unlocked state to the locked state.

Data 1, 2 defining the first and second user input processes is stored in the memory 14.

In some implementations, the lock key 13b also functions as a power key. In such implementations, the first user input process and/or the second user input process may involve the user actuating the lock key 13b for no longer than a set period of time, because the processor 12 responds to actuation of the lock key 13b for longer than that particular threshold period of time by switching the device 20 off rather than into the locked state.

Figure 4B:
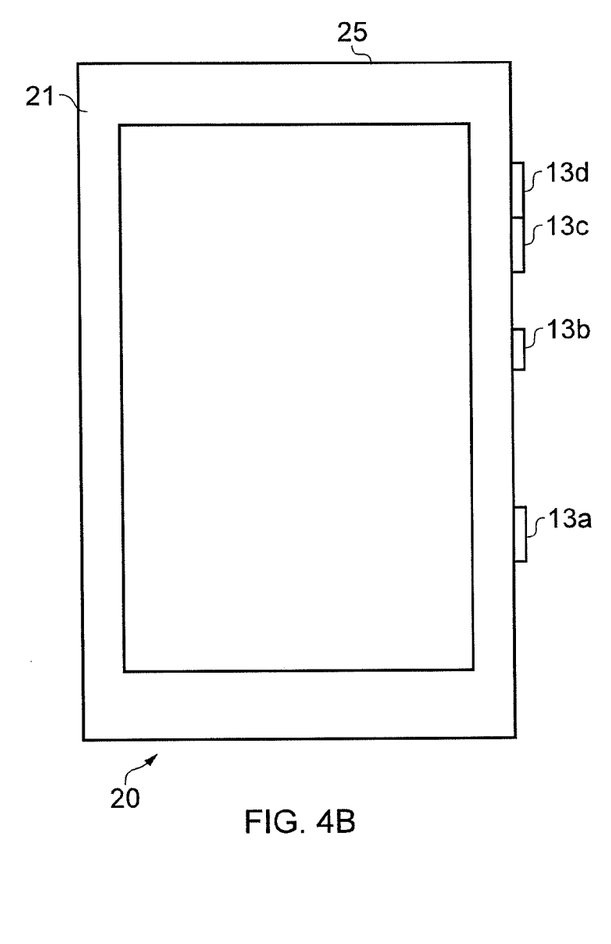
FIG. 4B illustrates the portable electronic device in a locked state, where the display has been disabled.

FIG. 4B illustrates the device 20 when it has been switched into the locked state and the display 11 has been switched off by the processor 12.

At block 501 in FIG. 5, the processor 12 sets a user input process for subsequently switching the device 20 from the locked state to the unlocked state, in dependence upon the user input provided to switch the device 20 from the unlocked state to the locked state. The user input process that is set may be selected from a plurality of possible user input processes.

For instance, if the first user input process is used to lock the device 20, then the processor 12 sets a third user input process as the process for unlocking the device 20. Alternatively, if the second user input process is used to lock the device 20, the processor 12 sets a fourth user input process as the process for unlocking the device 20.

Data 3, 4 defining the third and fourth user input processes is stored in the memory 14.

In this example, the third user input process comprises: i) actuating the lock key 13b, ii) providing a translation input, and iii) providing a password. In other examples, the third user input process may be different. For example, it might not include ii) or iii).

Figure 4C:
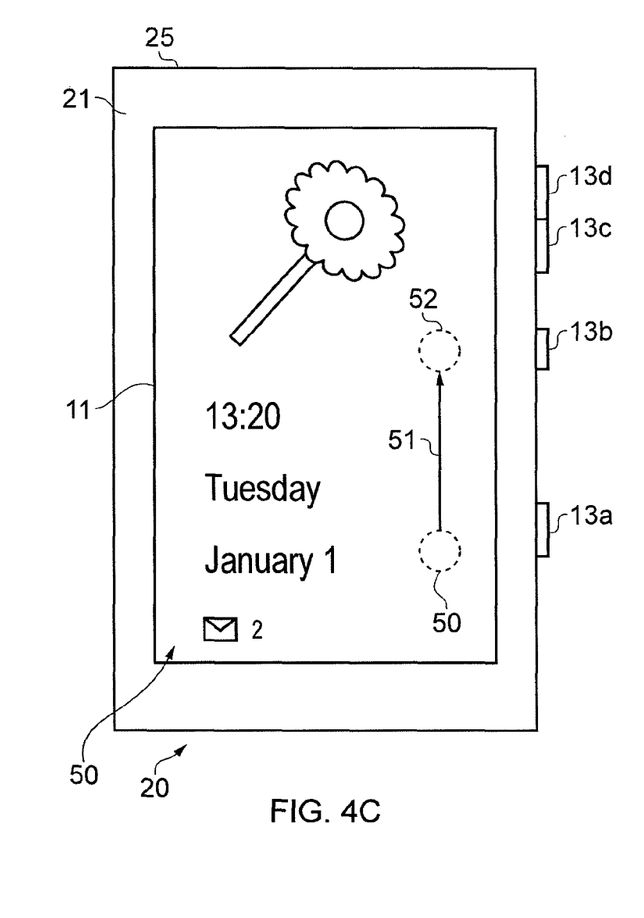
FIG. 4C illustrates the portable electronic device in a locked state, where the display is displaying a lock screen.
Figure 4D:
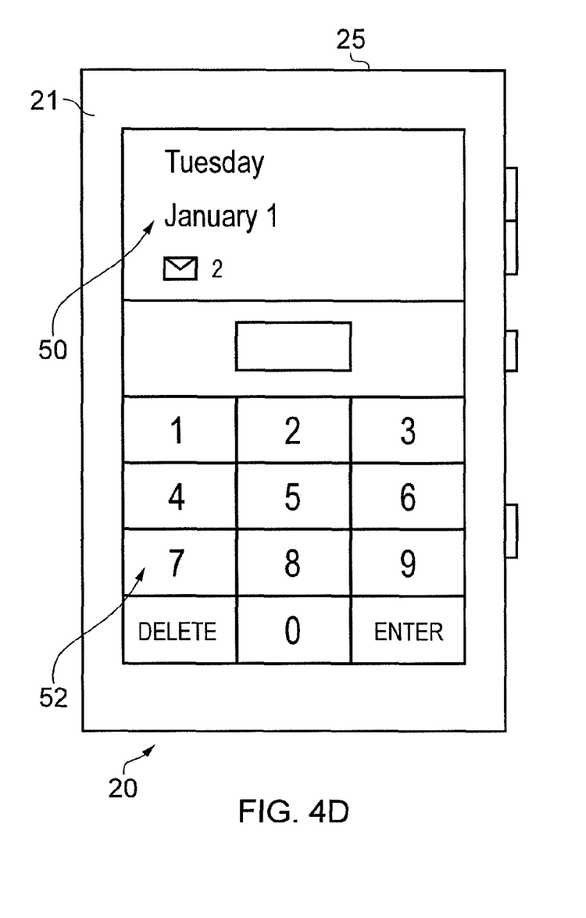
FIG. 4D illustrates the portable electronic device, in a locked state, enabling a user to enter a password.

FIGS. 4C and 4D illustrate the device 20 while the third user input process is being completed by a user. Following the device's entry into the locked state as illustrated in FIG. 4B, when the user actuates the lock key 13b, the processor 12 responds by causing the touch sensitive display 11 to display a lock screen 50. At this point in time, the device 20 remains in the locked state.

The display of the lock screen 50 is effectively a request for the user to provide a particular translation input in step/part ii) of the third user input process for unlocking the device 20. In this instance, the particular translation input is an upwards translation input, as illustrated by arrow 51 illustrated in FIG. 4C between the start point 50 and the end point 52 of the translation input. As the translation input is provided by an object such as a user digit or a stylus, the lock screen 50 moves (upwardly) with the object.

In this example, the processor 12 responds to input of the requested translation input by requesting a password from the user, as shown in FIG. 4D. At this point in time, the device 20 remains in the locked state. In the FIG. 4D illustration, the lock screen 50 remains partially visible when the request 52 for a password is made. The password may, for instance, include letters and numbers, solely letters or solely numbers.

In the event that the user responds to the request 52 by providing the correct password, the processor 12 responds by switching the device 20 from the locked state to the unlocked state, because the third user input process is complete.

In this example, when the device 20 enters the unlocked state the processor 12 causes the display 11 to display the same screen that was being displayed when the device 20 was locked. Therefore, if the home screen 40 was being displayed by the device 20 when it was switched from the unlocked state to the locked state, the processor 12 causes the display 11 to display the home screen 40.

As explained above, in the event that the device 20 is switched from the unlocked state to the locked state using the second user input process (comprising, for instance, actuating the lock key 13b twice within a threshold period of time), the processor 12 sets the fourth user input process (rather than the third user input process) as the process for switching the device 20 from the locked state to the unlocked state.

The fourth user input process might comprise some but not all of the parts/steps of the third user input process. For example, the fourth user input process may be the same as the third user input process but without one or more of the steps/parts.

In this example, the fourth user input process comprises merely: i) actuating the lock key 13b. When the lock key 13b is actuated, the processor 12 responds by switching the device 20 from the locked state to the unlocked state. When the device 20 enters the unlocked state, the processor 12 causes the display 11 to display the same screen that was being displayed when the device 20 was locked.

In summary, in the example described above, when the device 20 is locked by the user actuating the lock key 13b on a single occasion, the process for unlocking the device comprises: i) actuating the lock key 13b, ii) providing a translation input, and iii) providing a password. When the device 20 is locked by the user actuating the lock key 13b twice within a threshold period of time, the process for unlocking the device merely comprises: i) actuating the lock key 13b.

Embodiments of the invention enable a user to select a process for unlocking a device 20 when the device 20 is locked. If the user is aware when he locks the device 20 that he is going to unlock the device 20 soon, he can advantageously select an unlocking process that is simple and quick and easy to execute. Locking the device 20 in the short term (rather than merely leaving the device 20 unlocked) may be beneficial because it converses battery power, for instance, if the display 11 is at least partially disabled.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The blocks illustrated in the FIG. 5 may represent steps in a method and/or sections of code in the computer program 17. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, a translation input need not require the use of a touch sensitive display. In some implementations, the translation input may be carried out a distance from the display 11 and may be detected by a camera or a proximity sensor.

One or more of the first, second, third and fourth user input processes may be different from those described above. For example, in one implementation, the third user input process may comprise steps/parts i)-iii) as described above and the fourth user input process may comprise steps i) and ii) rather than merely step i).

In some embodiments, the processor 12 might reset the user input process for switching the device 20 from the locked state to the unlocked state. For example, if the device is locked using the second user input process and is not unlocked using the fourth user input process within a threshold period of time, the processor 12 may reset the user input process for unlocking the device 20 such that the third user input process is required to unlock the device 20.

This may advantageously prevent the device 20 from being inadvertently unlocked in circumstances where the user selects a simple unlocking process (such unlocking by merely actuating the lock key 13b) but forgets he has done so and then, for example, places the device 20 in his bag or pocket where the simple unlocking process may be unintentionally carried out.

The first, second, third and fourth user input processes for locking and unlocking the device 20 need not be the same as those described above. For instance, the second user input process could comprise or consist of actuating the lock key 13b followed by another key (such as the key labeled with the reference numeral 13c). Alternatively, the second user input process could, for instance, comprise or consist of actuating the lock key 13b three times in succession.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus, comprising:
   at least one processor; and
   at least one memory storing computer program code configured, working with the at least one processor, to cause at least the following to be performed:
   enabling a user to follow a first user input process or a second user input process to switch a device from an unlocked state to a locked state, wherein the first user input process is different from the second user input process;
   if the user follows the first user input process, responding to the first user input process by switching the device from the unlocked state to the locked state and by setting a third user input process for switching the device from the locked state to the unlocked state: and
   if the user follows the second user input process, responding to the second user input process by switching the device from the unlocked state to the locked state and by setting a fourth user input process for switching the device from the locked state to the unlocked state, wherein the fourth user input process is different from the third user input process.

2. An apparatus as claimed in claim 1, wherein the third user input process comprises providing a password, and the fourth user input process does not comprise providing a password.

3. An apparatus as claimed in claim 1, wherein the third user input process comprises providing a translation input, and the fourth user input process does not comprise providing a translation input.

4. An apparatus as claimed in claim 1, wherein the device comprises a display and a key separate from the display, and the third user input process comprises actuating the key, and the fourth user input process comprises actuating the key.

5. An apparatus as claimed in claim 1, wherein switching the device from the unlocked state to the locked state comprises at least partially disabling a display of the device.

6. An apparatus as claimed in claim 5, wherein the display is a touch sensitive display, and touch functionality of the touch sensitive display is disabled when the device is switched from the unlocked state to the locked state.

7. An apparatus as claimed in claim 1, wherein the apparatus is the device or the device comprises the apparatus.

8. The apparatus as claimed in claim 1, wherein the fourth user input process includes at least one user input, and that at least one user input forms a part of the third user input process.

9. A method, comprising:
   enabling a user to follow a first user input process or a second user input process to switch a device from an unlocked state to a locked state, wherein the first user input process is different from the second user input process;
   if the user follows the second user input process, responding to the first user input process by switching the device from the unlocked state to the locked state and by setting a third user input process for switching the device from the locked state to the unlocked state; and if the user follows the second user input process, responding to the second user input process by switching the device from the unlocked state to the locked state and by setting a fourth user input process for switching the device from the locked state to the unlocked state, wherein the fourth user input process is different from the third user input process.

10. A method as claimed in claim 9, wherein the third user input process comprises providing a password, and the fourth user input process does not comprise providing a password.

11. A method as claimed in claim 9, wherein the third user input process comprises providing a translation input, and the fourth user input process does not comprise providing a translation input.

12. A method as claimed in claim 9, wherein the device comprises a display and a key separate from the display, and the third user input process comprises actuating the key, and the fourth user input process comprises actuating the key.

13. A method as claimed in claim 9, wherein switching the device from the unlocked state to the locked state comprises at least partially disabling a display of the device.

14. A method as claimed in claim 13, wherein the display is a touch sensitive display, and touch functionality of the touch sensitive display is disabled when the device is switched from the unlocked state to the locked state.

15. The method as claimed in claim 9, wherein the fourth user input process includes at least one user input, and that at least one user input forms a part of the third user input process.

16. A non-transitory computer readable medium storing computer program code configured, working with the at least one processor, to cause at least the following to be performed:

enabling a user to follow a first user input process or a second user input process to switch a device from an unlocked state to a locked state, wherein the first user input process is different from the second user input process;

if the user follows the first user input process, responding to the first user input process by switching the device from the unlocked state to the locked state by setting a third user input process for switching the device from the locked state to the unlocked state; and if the user follows the second user input process, responding to the second user input process by switching the device from the unlocked state to the locked state and by setting a fourth user input process for switching the device from the locked state to the unlocked state, wherein the fourth user input process is different from the third user input process.

17. A non-transitory computer readable medium as claimed in claim 16, wherein the third user input process comprises providing a password, and the fourth user input process does not comprise providing a password.

18. A non-transitory computer readable medium as claimed in claim 16, wherein the third user input process comprises providing a translation input, and the fourth user input process does not comprise providing a translation input.

19. A non-transitory computer readable medium as claimed in claim 16, wherein the device comprises a display and a key separate from the display, and the third user input process comprises actuating the key and the fourth user input process comprises actuating the key.

20. The method as claimed in claim 16, wherein the fourth user input process includes at least one user input, and that at least one user input forms a part of the third user input process.

* * * * *